Patented May 12, 1953

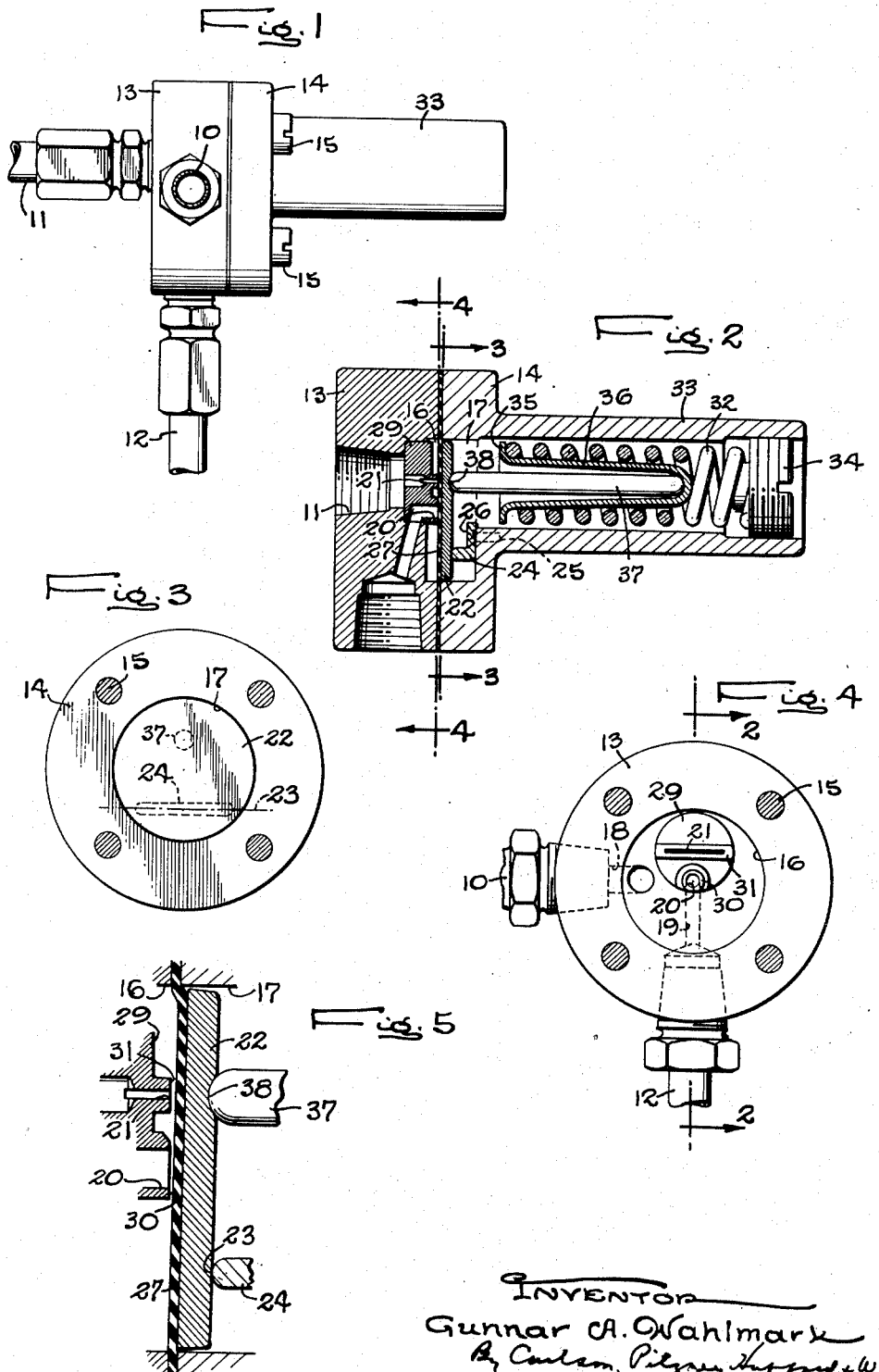

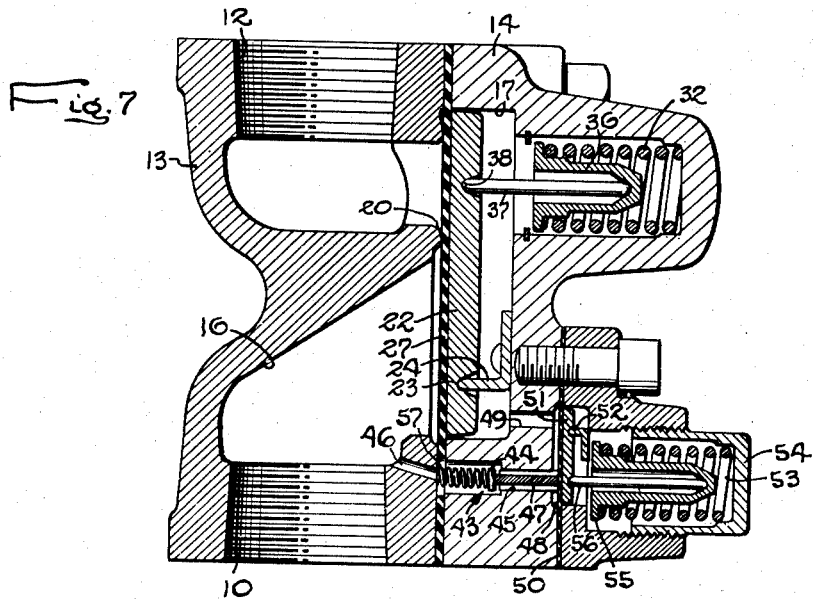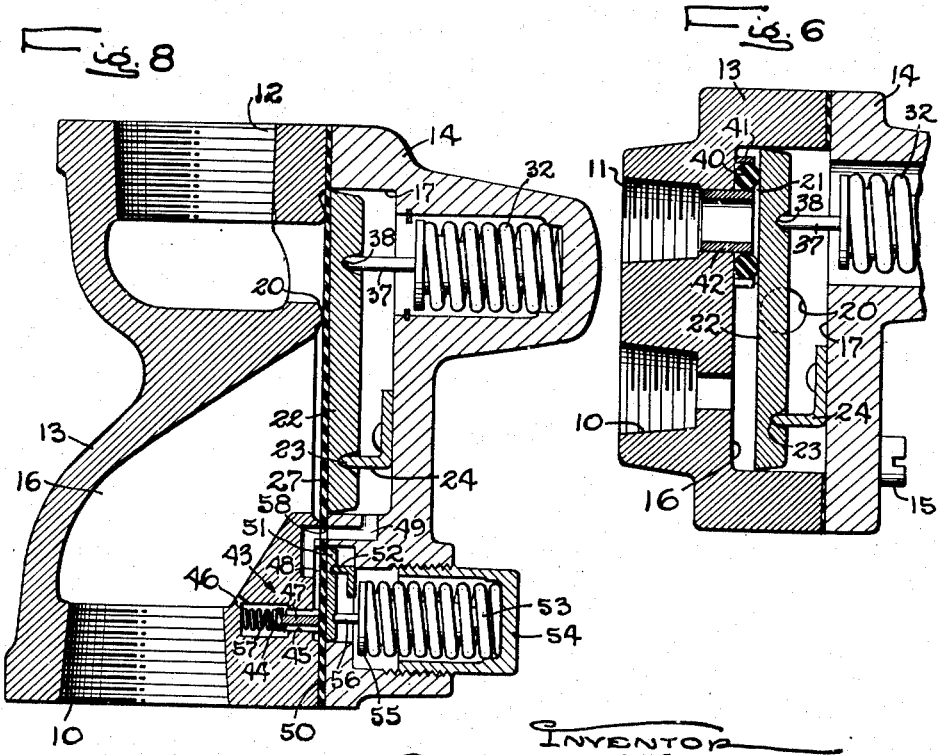

2,638,109

UNITED STATES PATENT OFFICE 2,638,109

PRESSURE REGULATING VALVE

Gunnar A. Wahlmark, Rockford, Ill.

Application April 4, 1949, Serial No. 85,445

12 Claims. (Cl. 137—116)

This invention relates generally to valves responsive automatically to pressure changes in a fluid chamber and operable to by-pass fluid when the pressure reaches a value predetermined by spring or other loading of the movable valve element. In certain of its aspects, the invention is concerned with relief valves which incorporate an auxiliary valve controlling the flow of fluid out of the pressure chamber and adapted to effect a quick cut off of such flow in response to stopping of a pump supplying fluid to the chamber.

The general object of the invention is to provide a new and improved valve of the above character which is simple and compact in construction, easy to manufacture, which avoids the use of sliding parts or parts requiring close fitting, and which is sensitive to pressure pulsations in the pressure supply line.

A more detailed object is to provide a relief valve in which the valving action is achieved in a novel manner by rocking of a flapper type member to open and close a coacting port.

A further object is to combine the valve flapper with a diaphragm by which the fluid pressure chamber is sealed effectually and the flapper is supported for free rocking movement.

Another object is to combine the relief valve with an auxiliary or cut-off valve whose movable element is also formed by the rocking flapper member.

Still another object is to provide for loading of the valve in a novel manner so as to adapt it for operation at high pressure.

The invention also resides in the novel construction and arrangement of the parts which facilitate manufacture at low cost and provide extreme sensitivity in response to pressure changes.

Other objects and advantages of the invention will become apparent from the following detailed description taken in connection with the accompanying drawings, in which Figure 1 is a side elevational view of a valve embodying the novel features of the present invention.

Fig. 2 is a diametrical sectional view taken along the line 2—2 of Fig. 4.

Figs. 3 and 4 are sections taken respectively along the lines 3—3 and 4—4 of Fig. 2.

Fig. 5 is an enlarged fragmentary section similar to Fig. 2 but showing a different position of the valve flapper.

Fig. 6 is a view similar to Fig. 2 showing a modified form of the invention.

Figs. 7 and 8 are similar sectional views of another modification with the parts shown in different positions.

For purposes of illustration, the invention is shown in the drawings incorporated in a selfcontained unit adapted to receive fluid at varying pressures through an inlet 10 and deliver fluid at a substantially constant pressure from an outlet 11 while by-passing the fluid excess out through an auxiliary outlet 12. Fluid is usually supplied to the valve by a power driven pump, the speed of which and therefore the rate of fluid delivery may vary considerably.

The hollow casing of the valve unit comprises two parts 13 and 14 clamped together by screws 15 and recessed interiorly to form two chambers 16 and 17, the former of which communicates with the inlet 10 from the pump through a passage 18 and with the by-passage outlet 12 through a passage 19 which terminates within the chamber 16 in a port 20. The outlet 11 also communicates with the chamber 16 and terminates in a port 21, the shape and location of which depend on whether or not the unit is to incorporate an auxiliary valve for providing a sharp cut-off of the fluid flow.

The invention contemplates separating the chambers 16 and 17 by a flapper 22 which is mounted to rock back and forth in response to pressure changes in the chamber 16 to vary the opening of the by-pass port 20 so as to regulate the pressure of the fluid delivered through the outlet 11. While the flapper may be of various shapes such as rectangular or oblong, it is preferred to employ a circular disk of sufficient thickness to remain flat under the applied forces. The disk is only slightly smaller than the diameter of the cylindrical side wall of the chamber 17 in which the disk is adapted to rock freely and is centered by the chamber side wall.

The disk constitutes a lever and rocks about a fulcrum 23 which extends across the disk along a chord thereof spaced a short distance from the disk edge. The fulcrum may be defined by a bar 24 within the chamber 17 bearing against the surface of the disk and rigidly secured to the casing part 14 as by screws 25 extending through a flange 26 and threading into the bottom wall of the casing part 14.

In the preferred form shown in Figs. 1 to 4, the other side of the flapper disk 22 is covered by a relatively thin layer 27 of less rigid material which layer forms the central portion of a diaphragm clamped around its periphery between the parts 13 and 14 of the casing. The diaphragm which is normally flat may be composed of relatively firm oil resistant plastic material such as rubber, Celluloid, etc. which is sufficiently thin and deformable to flex as illustrated in Fig. 5 and allow the small movement of the flapper which is required to open and close the valve ports. The diaphragm effectually seals the fluid chamber 16 and therefore allows a somewhat greater degree of looseness in the fit of the flapper within the casing. The diaphragm need not be bonded or otherwise secured to the disk 22.

The flapper, one side surface of which is formed by the yieldable material constituting the central part of the diaphragm, cooperates with the port 20 above referred to to form the by-pass valve, which port is defined by a hollow plug 29 upstanding from the bottom of the chamber 16 and externally beveled at its end to merge with a flat annular seat 30 of narrow radial width around the port 20. The latter is spaced a substantial distance from the fulcrum 23, preferably along a diameter of the disk 22 perpendicular to the fulcrum. Where, as in the present instance, the unit incorporates a cut-off valve, the by-pass port 20 may, as shown, be located substantially at the center of the disk while the cut-off port 21 is disposed more remotely from the disk fulcrum.

While the cut-off port may, if desired, be divided into a plurality of parts, it is shown herein as comprising an elongated narrow slot paralleling the fulcrum 23 and surrounded by a flat end or seat 31 which is of narrow width and disposed substantially in the same plane as the seat 29 of the by-pass valve. The yieldable surface of the flapper thus engages the seats 30 and 31 substantially simultaneously, and under nearly the same pressure, the flapper then being disposed in a plane determined by the three point support provided by the fulcrum pin 24 and one or both of the seats. The cut-off and by-pass valves are then both closed.

The flapper 22 is normally urged in the valve closing direction by spring or hydraulic loading, or by a combination of both. In the form shown in Figs. 1 to 5, the loading force is produced by a compression spring 32 disposed on the side of the flapper opposite the pressure chamber 16 and within a tubular extension 33 of the casing 14. One end of the spring bears against a plug 34 screwed into the tube 33 and adapted for adjustment to vary the spring force. The other end of the spring bears against an abutment 35 on a cup 36 disposed within the spring and providing a seat for one end of a pin 37. The latter is disposed perpendicular to the flapper 22 and bears at its other end directly against the flapper at a point 38 which is so located with reference to the valve seats 30 and 31 that the fluid pressure on the flapper always holds the latter against its fulcrum 23. For this purpose, the point 38 is positioned approximately opposite the seat 31 at the end of the by-pass outlet so that fluid pressure on that segment of the disk 22 outwardly beyond the point 38 is less than the resultant pressure acting on the remaining segment which includes the fulcrum 23.

In operation of the preferred form of the valve shown in Figs. 1 to 4, the parts will be disposed in the positions shown in Fig. 2 when the resultant pressure of the fluid in the chamber 16 is insufficient to overcome the spring force. The latter thus holds the diaphragm 27 against the seats 30 and 31. Both valves remain closed until the resultant pressure in the chamber 16 acting on the flapper 22 builds up to a value sufficient to overcome the spring. The flapper is then rocked about the fulcrum 23 so as to uncover the ports 20 and 21 substantially simultaneously. Fluid at the chamber pressure is admitted to the outlet 11, and, assuming a continuing supply of fluid, the chamber pressure remains at a substantially constant value owing to the small additional area of the flapper which becomes exposed by uncovering of the narrow seats 30 and 31. The excess of fluid which is supplied to the chamber 16 will be by-passed out through the port 20 at a rate which varies with changes in the spacing of the diaphragm 27 from the seat 30 caused by changes in the chamber pressure. Thus, as the pressure falls, the spring overcomes the fluid pressure on the flapper and moves the latter closer to the seat 30. Similarly, an increase in the chamber pressure above the value for which the spring is adjusted results in rocking of the flapper farther away from the valve seat 30 thus opening the by-pass valve to a greater degree.

The action of the flapper in controlling the by-pass opening results in very close regulation of the chamber pressure. This is due to the substantial elimination of friction or the possibility of binding between the moving parts and, as a result, the flapper is extremely sensitive to relatively small changes in the supply pressure. Moreover, the construction is exceedingly simple because close fitting of the parts is unnecessary. The diaphragm 27 effectually seals the pressure chamber 16, thereby avoiding air leakage into the fluid system. Because of the extreme sensitivity of the flapper to pressure changes, the valve is equally effective for cut-off purposes and operates to admit fluid to the outlet 11 or close the outlet in response to rises and falls of the supply pressure within a very narrow range. Finally, the valve is readily adjustable for use at various cut-off pressures simply by adjusting the spring 32. This is possible because the by-pass and cut-off ports 20 and 21 occupy the same relation with respect to the flapper for all operating pressures.

If desired, the diaphragm above referred to may be omitted and the flapper itself adapted to coact directly with the by-pass and cut-off ports 20 and 21 as shown in Fig. 6. A somewhat closer fit is employed between the periphery of the flapper disk and the casing wall, but the flapper is nevertheless adapted to rock freely about the fulcrum 23 in response to pressure changes within the chamber 16. In this instance, the by-pass port 20 is formed in the side wall of the casing 13, while the cut-off port 21 is defined by the end surface of an O ring 40 of grease resistant rubber or the like seated within a ring 41 and stretched over a tube 42 pressed into the casing outlet 11. A tight seal is thus formed around the cut-off outlet.

When the supply pressure is low, the flapper 22 is pressed against the ring 40 as shown in Fig. 6 and is also positioned to cover the port 20 and separate the same from the chamber 16. As the flapper moves to open the cut-off valve when the pressure rises to a predetermined value, the port 20 is also partially uncovered to initiate by-passing of the fluid the same as in the form first described. Thereafter, the by-pass port is opened or closed different amounts depending on the supply pressure variations, the result being to maintain a closely regulated pressure within the chamber 16.

To adapt the valve for operation at higher pressures without correspondingly increasing the size of the spring 32 and the over-all dimensions of the valve as a whole, provision may be made for loading the flapper wholly or partly by fluid pressure. Such modification is shown in Figs. 7 and 8 in which the parts common to Figs. 1 to 4 are numbered correspondingly. Each of these modifications involves the use of a pressure reducing valve 43 which controls the admission of pressure fluid from the high pressure inlet passage 10 to the chamber 17 of the relief valve so as to maintain in the latter a pressure which, combined with the force of the spring 32, balances the total pressure which the fluid in the chamber 16 exerts on the diaphragm 27.

While the reducing valve may take various forms, it is shown herein as comprising a valve member or head 44 formed on a fluted stem 47 and slidable into and out of the end of a cylinder 45 forming part of a fluid passage which extends from the inlet 10 through a passage 46 and the cylinder 45 into a chamber 48 which communicates with the chamber 17 through a passage 49. The chamber 48 (Fig. 8) is disposed within the part 13 of the main valve casing, and one wall thereof is defined by a diaphragm 50 which bears against the inner end of the valve stem 47 and is held against the latter by a spring 57 acting on the head or valve member 44. The diaphragm is backed by a flapper disk 51 which, as in the case of the flapper 22 is fulcrumed on a bar 52 which extends along a chord of the disk on the side thereof remote from the stem 47. The fluid pressure acting on the diaphragm 50 is opposed by a spring 53 acting in compression between a cap 54 and an abtument 55 which is movable with a pin 56 bearing against the flapper disk 51 substantially in alinement with the valve stem 47. The cap 54 is screwed into the casing part 14 and may be adjusted to vary the stressing of the spring 53 and therefore the pressure which the reducing valve maintains in the chambers 17 and 48.

As shown in Fig. 7, a separate diaphragm may be employed so that the relief valve may be disposed within the valve casing in any desired location. Or, as shown in Fig. 8, the diaphragm 50 may be an extension of the main diaphragm 27 in which case the passage 49 is extended through a hole 58 in the diaphragm.

In operation of the valves as shown in Figs. 7 and 8, the main valve flapper 22 will be in closed position as shown when the pressure in the loading chamber 17 is below that which the reducing valve 43 normally maintains. At this time, the fluid pressure exerted on the diaphragm 50 is overcome by the force of the spring 53 which moves the flapper 51 far enough to displace the valve member 44 out of the cylinder 45. With the reducing valve thus open, pressure fluid flows from the supply passage 10 into the chambers 47 and 17 thus increasing the pressure in the latter. As this pressure increases to a value sufficient to overcome the spring 53, the flapper 51 is rocked counterclockwise about the fulcrum 52 until the member 44 has become seated. This occurs when the predetermined pressure has been attained in the chamber 17. This pressure is maintained automatically and within close limits by the action of the valve 43 so that the desired portion of the loading of the main valve flapper 22 may be produced by fluid pressure derived from the supply inlet 10.

I claim as my invention:

1. A pressure regulating valve having, in combination, a casing comprising two parts clamped together in abutting relation, a generally flat flexible diaphragm clamped between said casing parts and dividing the casing into first and second chambers, the first chamber having a fluid inlet, a rigid flat disk fitting loosely within the walls of said second chamber and lying against said diaphragm, means on said casing within said second chamber providing a fulcrum for said disk extending along a chord thereof on the side opposite said diaphragm, means providing a by-pass outlet from said first chamber including a hollow projection in said first chamber spaced laterally from said axis and terminating in a seat of narrow width disposed close to said diaphragm for abutting engagement therewith to close the outlet, and means including a spring acting on said disk and diaphragm and urging the two toward said seat whereby to maintain said outlet closed until the pressure in said first chamber acting on said diaphragm rises sufficiently to move said disk and diaphragm away from said seat.

2. A pressure regulating valve having, in combination, a hollow casing, a flexible diaphragm dividing the casing into first and second chambers, the first chamber having a fluid inlet, a rigid flapper fitting loosely within the walls of said second chamber and lying against said diaphragm, said flapper having a covering of yieldable material on the diaphragm side thereof, means on said casing within said second chamber providing a fulcrum for said flapper to permit rocking thereof about an axis paralleling said diaphragm, means providing a by-pass outlet from said first chamber including a hollow projection in said first chamber spaced laterally from said axis and terminating in a seat of narrow width disposed close to the yieldable flapper surface for engagement therewith to close the outlet, and a spring acting on said flapper and urging the same toward said seat whereby to maintain said outlet closed until the pressure in said first chamber rises above a predetermined value.

3. A pressure regulating valve having, in combination, a hollow casing, a flexible diaphragm dividing the casing into first and second chambers, the first chamber having a fluid inlet, a rigid flapper fitting loosely within the walls of said second chamber and lying against said diaphragm, said flapper having a covering of yieldable material on the diaphragm side thereof, means on said casing within said second chamber providing a fulcrum for said flapper to permit rocking thereof about an axis paralleling said diaphragm, means providing a by-pass outlet from said first chamber including a port cooperating with the yieldable flapper surface to form a valve, and means acting on said flapper and urging the same in a direction to close said valve until the pressure in said first chamber rises above a predetermined value.

4. A pressure regulating valve having, in combination, a hollow casing, a flexible diaphragm clamped between said casing parts and dividing the casing into a first chamber having a fluid inlet and a second chamber having a generally cylindrical side wall, a flat disk fitting loosely within the walls of said second chamber and lying against said diaphragm, means on said casing within said second chamber providing a fulcrum for said disk extending along a chord thereof on the side opposite said diaphragm, means providing a by-pass outlet from said first chamber including a seat spaced laterally from said axis and terminating close to said disk for engagement therewith to close the outlet, and means acting on said disk to urge the same toward said seat whereby to maintain said outlet closed until the pressure in the chamber rises above a predetermined value.

5. A pressure regulating valve having, in combination, a hollow casing, a flexible diaphragm dividing the casing into first and second chambers, the first chamber having a fluid inlet, a flapper fitting loosely within said second chamber and lying against said diaphragm, means on said casing within said second chamber providing a fulcrum permitting rocking of the flapper about an axis lying adjacent one side thereof, means providing a by-pass outlet from said first chamber laterally spaced from said axis and disposed close to said flapper for engagement therewith to close the outlet, and means urging the said flapper toward said outlet to maintain the outlet closed until the pressure in said first chamber has risen above a predetermined value.

6. A pressure relief valve comprising a casing providing a fluid chamber having an inlet opening, a flapper forming one wall of said chamber and pivoted on said casing to rock about an axis lying adjacent one side of the flapper, means providing a by-pass outlet from said chamber including a port and a surrounding seat adapted for abutting engagement with the opposite side of said flapper, and means acting on said flapper eccentrically of said axis to urge the flapper toward said seat and thereby determine the pressure in said chamber at which the flapper is moved to open said port.

7. A pressure relief valve comprising a casing providing a fluid chamber having an inlet opening, a disk forming one wall of said chamber and pivoted on said casing to swing about a chord extending across one side of the disk, means providing a by-pass outlet from said chamber terminating in a port which is disposed on the opposite side of said disk and coacts with the disk to form a valve, and a spring acting on said disk eccentrically of said pivotal axis to urge the disk toward said port and thereby determine the pressure in said chamber at which the disk is moved to open said port.

8. A pressure relief valve comprising a casing providing a fluid chamber having an inlet opening, a flapper forming one wall of said chamber and pivoted on said casing to swing about an axis lying adjacent one side of the flapper, means providing a by-pass outlet from said chamber terminating in a port which coacts with the flapper to form a valve, and means acting on said flapper eccentrically of said axis to urge the flapper in a direction to close said port and thereby determine the pressure in said chamber at which the flapper is moved to open said port.

9. A pressure relief valve comprising a casing providing a fluid chamber having an inlet opening, a flapper forming one wall of said chamber and pivoted on said casing to rock about an axis adjacent one side of the flapper, means providing a by-pass outlet from said chamber terminating in a port in a side wall of said casing coacting with the edge of the flapper to form a valve, and means loading said flapper to urge the same past said port and thereby prevent the escape of fluid out of said chamber until the pressure in the chamber has risen sufficiently to overcome the loading of the flapper and moved the latter to uncover said port.

10. A valve of the character described comprising a casing providing a fluid chamber having an inlet opening, a flapper forming one wall of said chamber and pivoted on the casing to rock about an axis extending across one side of the flapper, means providing two outlets from said chamber terminating in ports which are laterally spaced apart on the opposite side of the flapper, said ports being surrounded by seats adapted for abutting engagement substantially simultaneously with the flapper, and means loading said flapper to urge the same yieldably toward said seats and thereby prevent the escape of fluid through either of said ports until the chamber pressure has risen above a predetermined value.

11. A valve of the character described comprising a casing providing a fluid chamber having an inlet opening, a flapper forming one wall of said chamber and pivoted on the casing to rock about an axis extending across one side of the flapper, means providing two outlets from said chamber terminating in spaced ports cooperating with said flapper to form two valves adapted to be opened substantially simultaneously upon rocking of the flapper in one direction and to be closed upon reverse rocking of the flapper, and means loading said flapper to urge the same yieldably in a direction to close said valves and thereby prevent the escape of fluid through either of said ports until the chamber pressure has risen above a predetermined value.

12. A valve having, in combination, a casing comprising two parts, a flexible diaphragm clamped between said casing parts and dividing the casing into first and second chambers, the first chamber having a fluid inlet, a flapper fitting loosely within the walls of said second chamber and lying against said diaphragm, means on said casing within said second chamber providing a fulcrum for said flapper extending across the side thereof opposite said diaphragm, means providing an outlet from said first chamber including a hollow projection in said first chamber spaced laterally from said axis and terminating in a seat disposed close to said diaphragm for abutting engagement therewith to close the outlet, means acting on said flapper and diaphragm and urging the two toward said seat whereby to maintain said outlet closed until the pressure in said first chamber acting on said diaphragm rises sufficiently to move said disk and diaphragm away from said seat, said urging means including a passage for establishing communication between said inlet and said second chamber, and a spring loaded pressure reducing valve interposed in said passage and operable automatically to maintain a predetermined reduced pressure in said second chamber.

GUNNAR A. WAHLMARK.

References Cited in the file of this patent

UNITED STATES PATENTS

| Number | Name | Date |
|---|---|---|
| 901,084 | Erwood | Oct. 13, 1908 |
| 1,185,041 | Ashey | May 30, 1916 |
| 1,698,155 | Dorsey | Jan. 8, 1929 |
| 1,854,197 | Johnson | Apr. 19, 1932 |
| 2,303,130 | Moon | Nov. 24, 1942 |

FOREIGN PATENTS

| Number | Country | Date |
|---|---|---|
| 731,300 | France | of 1932 |